UNITED STATES PATENT OFFICE.

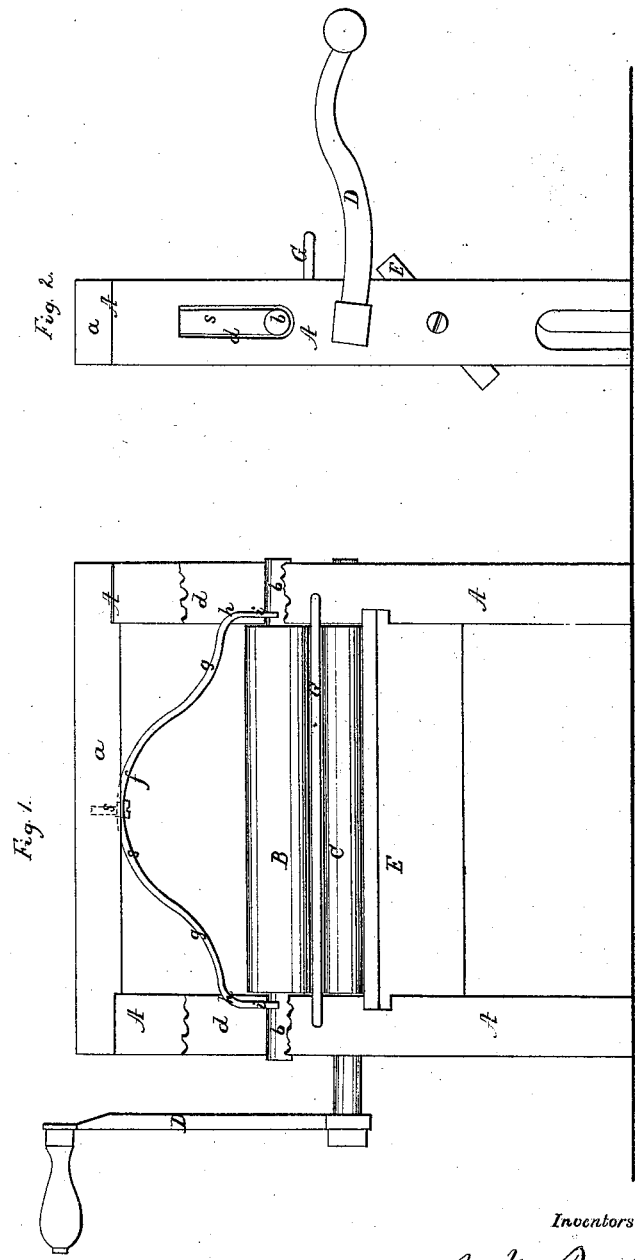

N. W. PEEBLES, OF BRUNSWICK, OHIO.

IMPROVED CLOTHES-WRINGING MACHINE.

Specification forming part of Letters Patent No. 36,362, dated September 2, 1862.

*To all whom it may concern:*

Be it known that I, N. W. PEEBLES, of Brunswick, in the county of Medina and State of Ohio, have invented a new and Improved Clothes-Wringer; and I do hereby declare that the following is a full and exact description thereof, reference being had to the accompanying drawings, making part of this specification—

Figure 1 being a side view of my improved clothes-wringer; Fig. 2, an edge view thereof.

Like letters designate corresponding parts in both figures.

My improvement is in pressure-roller clothes-wringers; and it consists in the improved construction and arrangement of the spring by which the pressure is given.

I employ a suitable frame, A, of side pieces, a cross-piece, $a$, and a dripping-board, E. There is also a rod, G, or its equivalent projecting from the rear, behind the rollers, to hold up the clothes away from the dripping-board. The lower roller, C, turns in a fixed position, and the crank D is attached to its shaft $c$. The journals $b\ b$ of the upper roller, B, turn in vertical slots $d\ d$ in the side pieces of the frame, so that the roller may move upward and downward. I employ a single spring, S, for giving elasticity to both ends of the roller B. This spring is constructed and arranged substantially as follows: It reaches across the whole length of the roller, its middle being secured to the middle of the cross-piece $a$ of the frame by a single screw, $s$, or its equivalent. The two ends of the spring bear immediately upon the journals $b\ b$ of the roller, being hollowed so as to fit the same. It may be made of sheet-steel of uniform thickness, and in order that it may act properly on the roller it has the peculiar form shown—namely, a downward concave curve, $f$, in the middle; then a concave curve upward a short distance toward each end; then a curve downward again at $h\ h;$ and, finally, a straight vertical portion, $i\ i$, at each end. The extent of the several curves is such that the whole downward curving is equal to the whole upward curving, so that the spring will lengthen as much as it will shorten both in ascending and descending. This shape causes the spring to bend without constraint and without its bearings $i\ i$ sliding on the journals $b\ b$ of the roller. This makes the cheapest spring known to me, and perfect in its action, the two ends also being always equal in pressure, since one balances the other.

What I claim as my invention, and desire to secure by Letters Patent, is—

The single spring S, acting directly on the journals of the pressure-roller B, constructed and arranged, in combination with the frame A and pressure-roller B, substantially as and for the purpose herein specified.

The above specification of my improved clothes-wringing machine signed by me this 15th day of July, 1862.

N. W. PEEBLES.

Witnesses:
WILLIAM GILCHRIST,
JAMES A. ROOT.